US008706662B2

(12) United States Patent
Chan et al.

(10) Patent No.: US 8,706,662 B2
(45) Date of Patent: Apr. 22, 2014

(54) METHOD AND APPARATUS OF CONTROLLING NOISE ASSOCIATED WITH SYNAPTIC INPUTS BASED ON NEURONAL FIRING RATE

(75) Inventors: Victor Hokkiu Chan, Del Mar, CA (US); Bardia Behabadi, San Diego, CA (US); Jason Frank Hunzinger, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 13/187,939

(22) Filed: Jul. 21, 2011

(65) Prior Publication Data

US 2013/0024410 A1    Jan. 24, 2013

(51) Int. Cl.
*G06E 1/00* (2006.01)

(52) U.S. Cl.
USPC ........................................... 706/15

(58) Field of Classification Search
USPC .......................................... 706/1, 15, 45, 62
See application file for complete search history.

(56) References Cited

U.S. PATENT DOCUMENTS

| | | | |
|---|---|---|---|
| 2003/0114886 A1* | 6/2003 | Gluckman et al. | 607/2 |
| 2006/0241356 A1* | 10/2006 | Flaherty | 600/301 |
| 2008/0045853 A1* | 2/2008 | Gluckman et al. | 600/544 |
| 2009/0118597 A1* | 5/2009 | Mills et al. | 600/301 |
| 2012/0117012 A1* | 5/2012 | Szatmary et al. | 706/27 |

OTHER PUBLICATIONS

Salinas, Emilio, and Terrence J. Sejnowski. "Impact of correlated synaptic input on output firing rate and variability in simple neuronal models.", 2000, The Journal of Neuroscience, pp. 6193-6209.*
Rogan, Christopher. "Learning in Stochastic Biological Neural Networks.", Princeton, 2005, pp. 1-30.*
Ranhel, João, et al. "Bistable memory and binary counters in spiking neural network.", 2011, Foundations of Computational Intelligence (FOCI), 2011 IEEE Symposium, pp. 66-73.*
Reyes, Synchrony-dependent propagation of firing rate in iteratively constructed networks in vitro, nature neuroscience, Jun. 2003, pp. 593-599.*
Bartolozzi, et al., "Implementing homeostatic plasticity in VLSI networks of spiking neurons," in 15th IEEE International Conference on Electronics, Circuits and Systems (ICECS), pp. 682-685, Aug.-Sep. 2008.
Bartolozzi, et al., "Silicon synaptic homeostasis", in Proceedings of BICS, vol. 72, issue 4-6, 2006, 6 pages.
Chicca, et al., "A VLSI Recurrent Network of Integrate-and-Fire Neurons Connected by Plastic Synapses With Long-Term Memory." IEEE Transactions on Neural Networks, vol. 14, No. 5, Sep. 2003, pp. 1297-1307.

(Continued)

*Primary Examiner* — David Vincent
(74) *Attorney, Agent, or Firm* — Rupit M. Patel (57) ABSTRACT

Certain aspects of the present disclosure support a technique for neuronal firing modulation via noise control. Response curve of a typical neuron with a threshold can transition from not firing to always firing with a very small change in the neuron's input, thus limiting the range of excitable input patterns for the neuron. By introducing local, region and global noise terms, the slope of the neuron's response curve can be reduced. This may enable a larger set of input spike patterns to be effective in causing the neuron to fire, i.e., the neuron can be responsive to a large range of input patterns instead of an inherently small set of patterns in a noiseless situation.

30 Claims, 6 Drawing Sheets

(56) References Cited

OTHER PUBLICATIONS

Indiveri, et al., "A VLSI reconfigurable network of integrate-and-fire neurons with spike-based learning synapses", in Institute of Neuroinformatics, In Proceedings of ESANN, 2004, pp. 405-410.

Indiveri, et al., "Spike-based learning in VLSI networks of integrate-and-fire neurons", in IEEE International Symposium on Circuits and Systems (ISCAS), pp. 3371-3374, May 2007.

Cameron K., et al., "Poisson distributed noise generation for Spiking neural applications", IEEE International Symposium on Circuit and Systems. ISCAS 2010—May 30-Jun. 2, 2010—Paris, France, IEEE, US, May 30, 2010, pp. 365-368, XP031724995, ISBN: 978-1-4244-5308-5.

Gammaitoni L., "Stochastic resonance and the dithering effect in threshold physical systems", Physical Review E, vol. 52, No. 5, Nov. 1, 1995, pp. 4691-4698, XP55040061, ISSN: 1063-651X, DOI : 10.1103/PhysRevE.52.4691.

International Search Report and Written Opinion—PCT/US2012/047482—ISA/EPO—Oct. 16, 2012.

McDonnell M.D., et al., "Neural mechanisms for analog-to-digital conversion", Proceedings of SPIE, Mar. 29, 2004, pp. 278-286, XP55040064, ISSN: 0277-786X, DOI: 10.1117/12.523165.

Moss F., "Stochastic resonance and sensory information processing: atutorial and review of application", Clinical Neurophysiology, vol. 115, No. 2, Feb. 1, 2004, pp. 267-281, XP55040058, ISSN: 1388-2457, DOI : 10.1016/j.clinph.2003.09.14.

Vilela R.D., et al., "Are the input parameters of white noise driven integrate and fire neurons uniquely determined by rate and CV?", Journal of Theoretical Biology, Academic Press, London, GB, vol. 257, No. 1, Mar. 7, 2009, pp. 90-99, XP025918399, ISSN: 0022-5193, DOI : 10.1016/J.JTBI.2008.11.004 [retrieved on Nov. 12, 2008].

* cited by examiner

METHOD AND APPARATUS OF CONTROLLING NOISE ASSOCIATED WITH SYNAPTIC INPUTS BASED ON NEURONAL FIRING RATE

BACKGROUND

1. Field

Certain aspects of the present disclosure generally relate to neural system engineering and, more particularly, to a method and apparatus of neuronal firing modulation via noise control.

2. Background

One of the fundamental properties of a neuron is its ability to be excited such that an output signal (generally in the form of an action potential) can be produced or fired. An internal neuronal setting, i.e., a threshold, can control whether an action potential is fired. If the spatial-temporally summed input signals is below the threshold (i.e., sub-threshold), then the neuron will not fire. However, if the summed input signals is above the threshold (i.e., supra-threshold), then the neuron will fire one or more action potentials.

In a typical neuron with a threshold, the response (input-output) curve can transition from not firing to always firing with a very small change in input, thus limiting the range of excitable input patterns for a neuron.

SUMMARY

Certain aspects of the present disclosure provide an electrical circuit. The electrical circuit generally includes a first circuit configured to monitor a firing rate of one or more neuron circuits of the electrical circuit, and a second circuit configured to control, based on the firing rate, a noise associated with one or more synaptic inputs of the one or more neuron circuits for adjusting the firing rate.

Certain aspects of the present disclosure provide a method for implementing a neural network. The method generally includes monitoring a firing rate of one or more neuron circuits of the neural network, and controlling, based on the firing rate, a noise associated with one or more synaptic inputs of the one or more neuron circuits for adjusting the firing rate.

Certain aspects of the present disclosure provide an apparatus. The apparatus generally includes means for monitoring a firing rate of one or more neuron circuits of the apparatus, and means for controlling, based on the firing rate, a noise associated with one or more synaptic inputs of the one or more neuron circuits for adjusting the firing rate.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
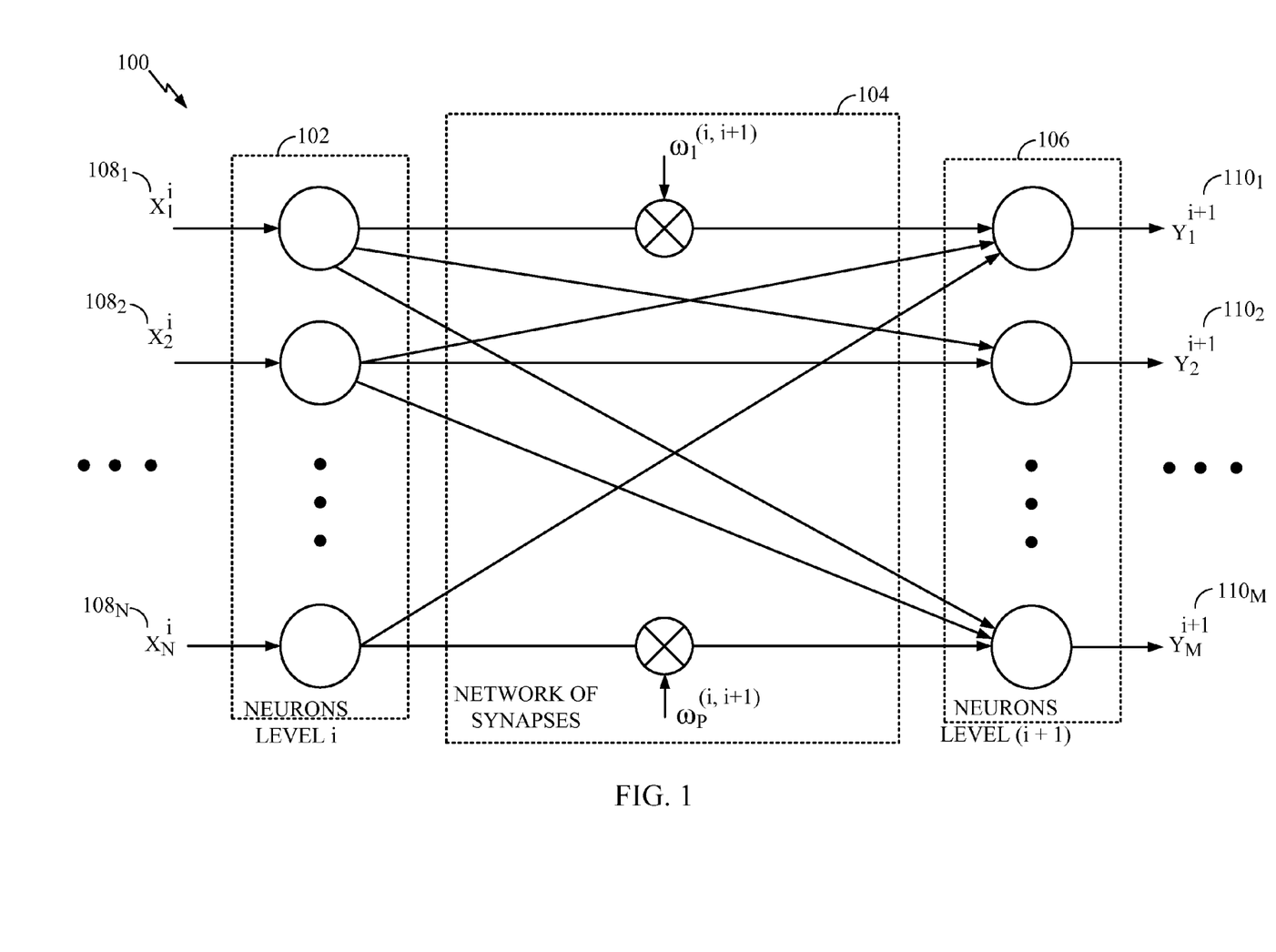
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Nonlinear Threshold Response

An input-output response curve of a typical neuron with a threshold (e.g., a neuron of the neural system 100 from FIG. 1) can transition from not firing to always firing with a very small change in the neuron's input, thus limiting the range of excitable input patterns for the neuron. By introducing local, region and global noise terms, the slope of neuron's response curve may be reduced. This may enable a larger set of input spike patterns to be effective in causing the neuron to fire, i.e., the neuron may be enabled to be responsive to a large range of input patterns instead of an inherently small set of patterns in a noiseless situation. The neuronal firing modulation via noise control proposed in the present disclosure may provide both flexibility and efficiency advantages.

Figure 2:
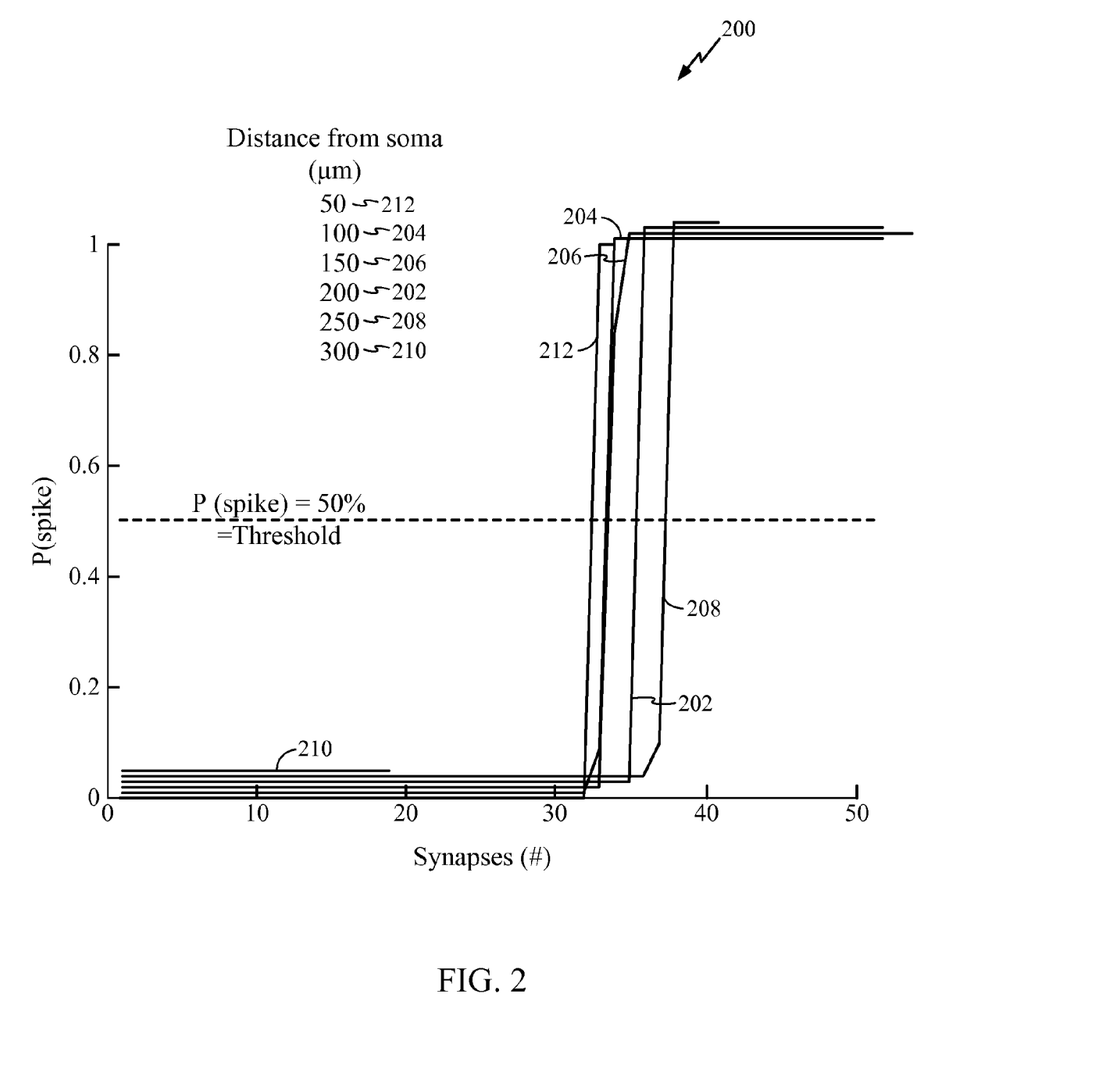
FIG. 2 illustrates an example of neuronal firing probability in the absence of noise in accordance with certain aspects of the present disclosure.

FIG. 2 illustrates an example 200 of neuronal firing probability in the absence of noise in accordance with certain aspects of the present disclosure. In a noiseless situation, the response curve of a neuron may be non-linear with a sharp transition around the neuron's firing threshold. In other words, a neuron may transition from not firing at all (with a probability of spike P(spike)=0) to 100% of firing (with a probability of spike P(spike)=1) in a matter of few synaptic inputs, if those added inputs cause the summed activity to cross the threshold, as illustrated in FIG. 2.

An example trace 202 in FIG. 2 illustrates that a neuron with 34 co-activated synapses may consistently fail to fire an action potential, but with 35 co-activated synapses, the neuron may consistently fire an action potential. This may be true not only in a point neuron model, but also in a multi-compartmental neuron model. Even if the synapses are distributed farther away from a soma, while it may impact a value of threshold, the slope of the transition may remain very sharp (e.g., as illustrated by traces 202, 204, 206, 208, 210 in FIG. 2).

This sharply nonlinear threshold response may post a practical problem in that if there is a mismatch in the density of co-activated synaptic activities, then the neuron may be non-responsive at all (if the density of input spikes is below threshold), or that it may be firing all the time (if the density is above threshold). In temporal coding, this may limit the range of spike pattern sizes that a neuron can encode or decode. For example, if the input spike pattern comprises 30 spikes, then it may be required to have neurons with a threshold of just below 30 in order to be able to encode the spike pattern. If, for example, the spike pattern comprises 20 spikes, then these neurons with a threshold around 30 may mismatch and may not be able to encode the pattern since the neuron is sub-threshold consistently despite the 20-spike input.

Linearizing Response Curve Via Noise Control

Certain aspects of the present disclosure support utilizing synaptic or somatic noise control to increase a range of spike pattern sizes to which a neuron is responsive.

Figure 3:
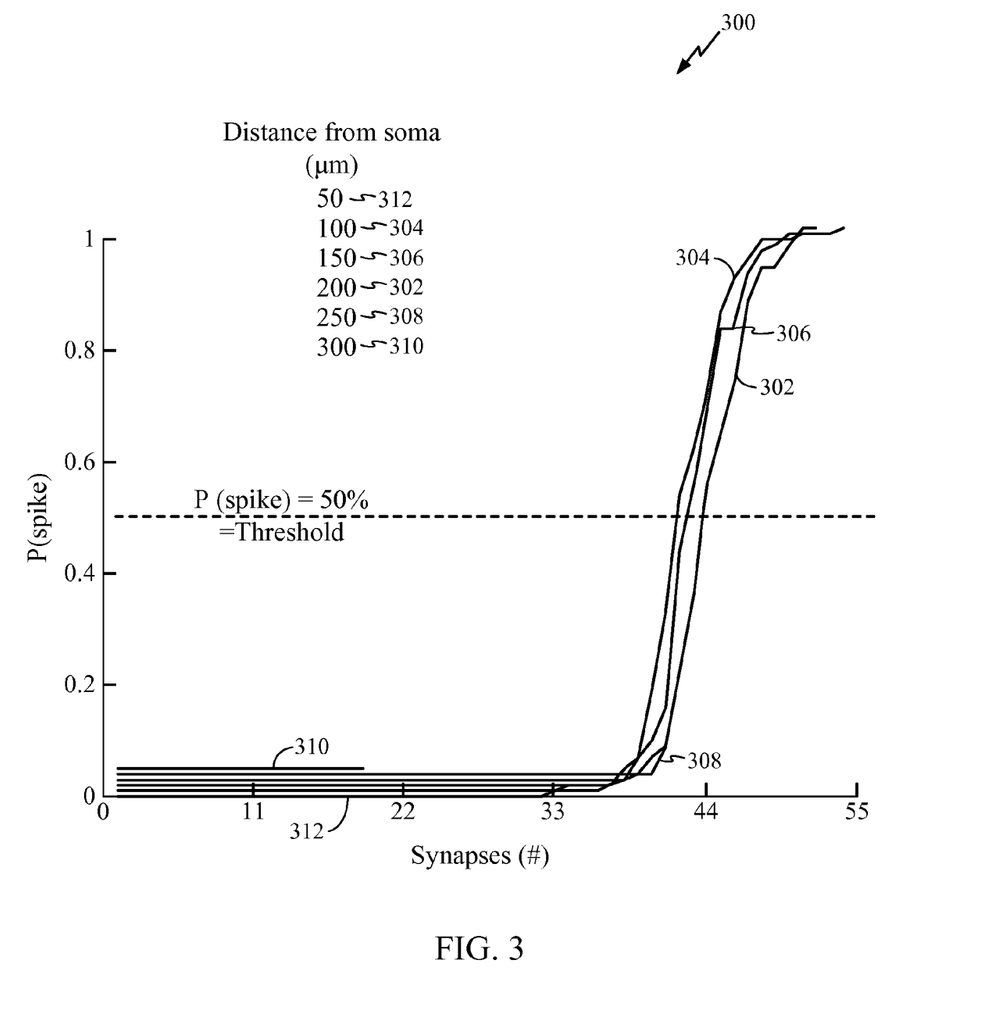
FIG. 3 illustrates an example of neuronal firing probability in the presence of synaptic noise (probabilistic release) in accordance with certain aspects of the present disclosure.
Figure 4:
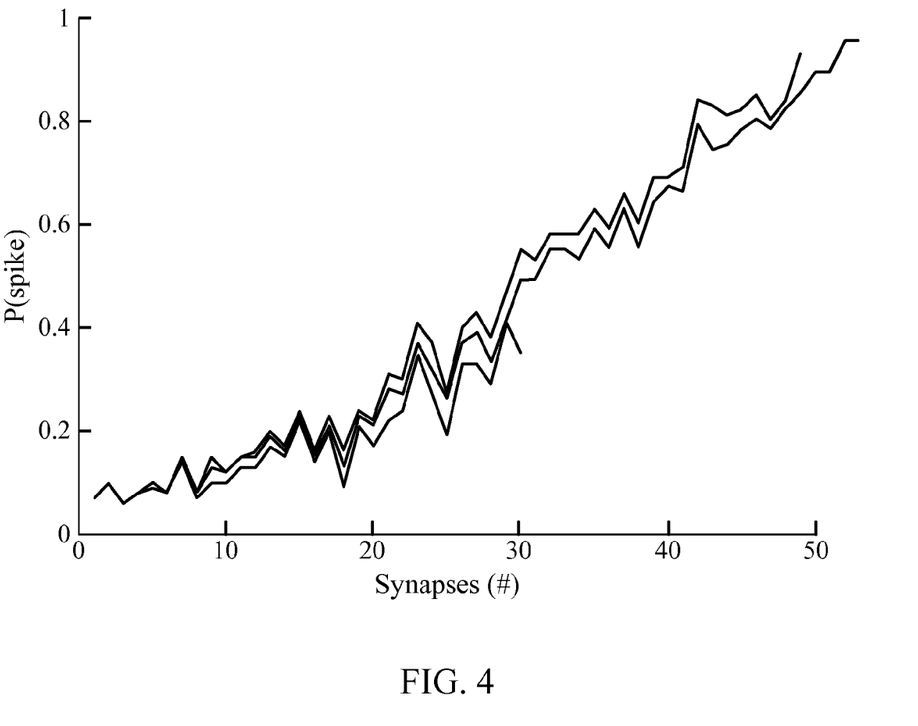
FIG. 4 illustrates an example of neuronal firing probability in the presence of somatic noise (somatic current injection) in accordance with certain aspects of the present disclosure.

The presence of background noise may alter the slope of the input-output curve, where the input may correspond to a number of input spikes and the output may correspond to a probability of firing. As a result, in a noiseless environment, a neuron may behave like a two-state switch, where there is a sharp transition in the number of coincident input spikes required for firing a neuron, as illustrated in FIG. 2. As noise increases, the slope of the neuron's firing probability as a function of coincident spikes may decrease, such that the number of coincidental input spikes required for firing a neuron may also decrease, as illustrated in FIG. 3 and FIG. 4, albeit with a lower probability. On the other hand, an increase in noise may also increase the number of coincidental input spikes required to fire a neuron with high probability. As a result, the noise may increase the range of input spike pattern sizes to which a neuron would respond.

The scope of noise control may be local, regional or global depending on the sources. In one aspect, the noise may be modulated at individual synapses, which corresponds to the local noise control. Alternatively, the local noise control may be distinguished by controlling synapses that belong to a particular neuron, or by controlling synapses of neurons in a particular layer. In another aspect, the noise may be modulated at thousands to a million of synapses, which corresponds to the regional noise control. In yet another aspect, the noise may be modulated at the entire set of synapses in the system, which corresponds to the global noise control.

Potential biological mechanisms sub-serving noise control may likewise be separated into local, regional, and global scope. In an aspect, a local spike noise may be sub-served by the degree of synaptic release stochasticity in a synapse. In another aspect, a regional spike noise may be sub-served by the frequency of spontaneous neurotransmitter release by an individual glial cell (e.g., with each glial cell affecting up to 100 thousand synapses) or by a network of gap-junction-linked glia cells, which may potentially impact millions of synapses. In yet another aspect, a global spike noise may be sub-served by hormonal modulation released into the blood stream, which may affect all neurons in the brain that have matching hormone receptors.

According to certain aspects of the present disclosure, there is a scope of impact of the noise control, i.e., which synapses are impacted by the noise control. In addition, there is a scope of the noise control input (e.g., a firing rate). In an aspect, the firing rate may represent a firing rate of neuron corresponding to synapses being noise-controlled. In another aspect, the firing rate may be an average firing rate of a population of neurons in a neural network.

Noise Control in Neural Network

Figure 5:
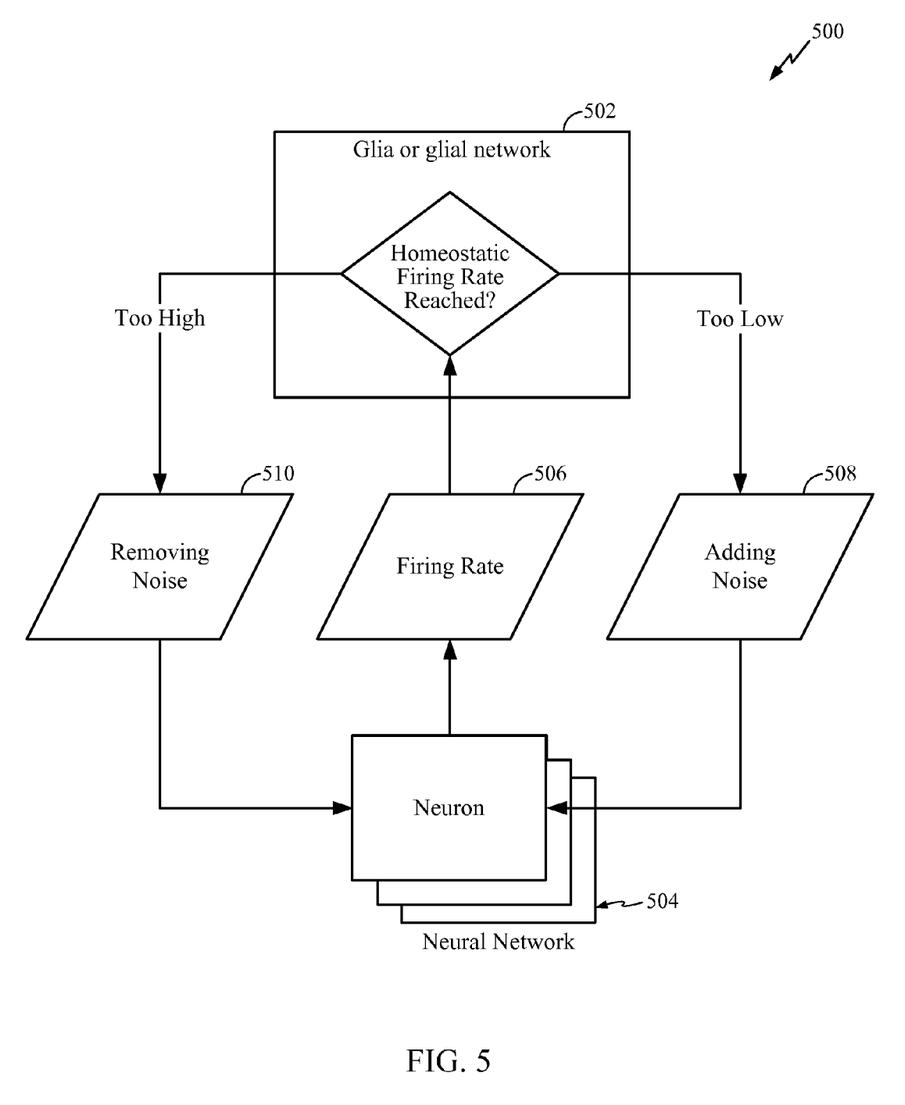
FIG. 5 illustrates an example of homeostatic firing rate maintenance via noise feedback in accordance with certain aspects of the present disclosure.

In order for a neuron or a network of neurons to be responsive to a wide range of spike pattern sizes, the response curve of individual neurons may be adjusted by using homeostatic firing rate monitoring and noise control. FIG. 5 illustrates an example control sequence 500 of homeostatic firing rate maintenance via noise feedback in accordance with certain aspects of the present disclosure.

Initially, a glia (or a glial network) 502 may generate a moderate (predefined) level of baseline/background noise into a network of neurons (hereafter a neural network) 504. As illustrated in FIG. 5, the glia 502 may monitor a firing rate 506 of neurons, e.g., via direct measurement or indirect measurement of metabolic or resource consumption.

After this, adjusting of the firing rate 506 relative to a homeostatic firing rate may be performed. If the monitored firing rate is too low (i.e., below the homeostatic firing rate), then a noise 508 may be injected into synapses of the neural network 504. As aforementioned, the injection of noise may increase the range of input spike patterns capable of firing a neuron; as a result, the neuron's firing rate may increase. The greater the deviation of the current firing rate from the homeostatic firing rate, the greater the amount of noise may be injected into the synapses. In an aspect, the rate of change in noise level may be gradual to ensure stability of the system.

On the other hand, if the monitored firing rate 506 is too high (i.e., greater than the homeostatic firing rate), then a noise 510 may be removed from synapses of the neural network 504. The removal of noise may decrease the range of input spike patterns capable of firing a neuron; as a result, the neuron's firing rate may decrease. The greater the deviation of the current firing rate from the homeostatic firing rate, the greater the amount of noise may be removed from the synapses. Again, the rate of change in noise level may be gradual to ensure stability of the system.

In an aspect of the present disclosure, monitoring and adjusting the firing rate 506 may be repeated until the homeostatic firing rate is attained.

Checking and adjusting the firing rate 506 relative to the homeostatic firing rate may be represented as the following noise differential:

$$\frac{dn}{dt} = k \cdot (f_h - f_c), \text{ where } f_h > 0, n_o > 0, k > 0, \quad (1)$$

where n is the noise level term or the noise gain control term, $n_o$ is the initial (predefined) noise value, k is the rate of change in noise level (i.e., a predefined parameter controlling a gradual rate of noise change), $f_h$ is the homeostatic firing rate, and $f_c$ is the current monitored firing rate. It can be observed from equation (1) that if $f_c < f_h$ (i.e., the monitored firing rate is too low), then the change of noise over time dn/dt is positive, i.e., the noise may be added to the synapses according to the rate of change. On the other hand, if $f_c > f_h$ (i.e., the monitored firing rate is too high), then the change of noise over time dn/dt is negative, i.e., the noise may be removed from the synapses according to the rate of change.

By introducing a noise term into a neuron or a network of neurons (neural network), the neural network may be enabled to modulate the range of spike pattern sizes that it responds to. If it is desired that the neural network is responsive to a wide range of spike pattern sizes, then a larger noise term may be added to the system. Conversely, if a narrow range of spike pattern sizes are desired, then a smaller term to even no noise term may be used.

It should be noted that the noise term being introduced into the neural network may not necessarily be the actual noise level or noise component, but rather a process controlled by noise. For example, the process of noise introduction into the neural network may be associated with a Poison spike generator, where the gain of generator may correspond to a mean spikes per second. In one aspect of the present disclosure, the neural network 504 may be associated with a Poison spike generator whose spikes-per-second (rate) may be controlled by the noise-level term. For example, the rate of Poison spike generator may start with a nominal rate. The output of the generator (spikes) may be then fed into the synapses of neural network, in addition to the non-noise input. In another aspect of the present disclosure, the weights of synapses may vary based on the noise-level term. In yet another aspect, one or more thresholds of one or more neurons of the neural network may vary based on the noise-level term.

By introducing a noise control feedback scheme with the homeostatic firing rate method from FIG. 5, the neural network may maintain its firing rate and yet be able to respond to a diversity of input spike pattern sizes. If input spike patterns are too small and not able to excite the neural network, then a deviation from homeostatic firing rate may be detected and noise may then be added such that a larger set of input spike patterns may now excite the neural network. If input spike patterns are too large and they excite the neural network constantly, then likewise noise may be reduced such that a smaller set of input spike patterns may now excite the neural network and thereby reducing the overall firing rate until the homeostatic firing rate is reached.

Figure 6:
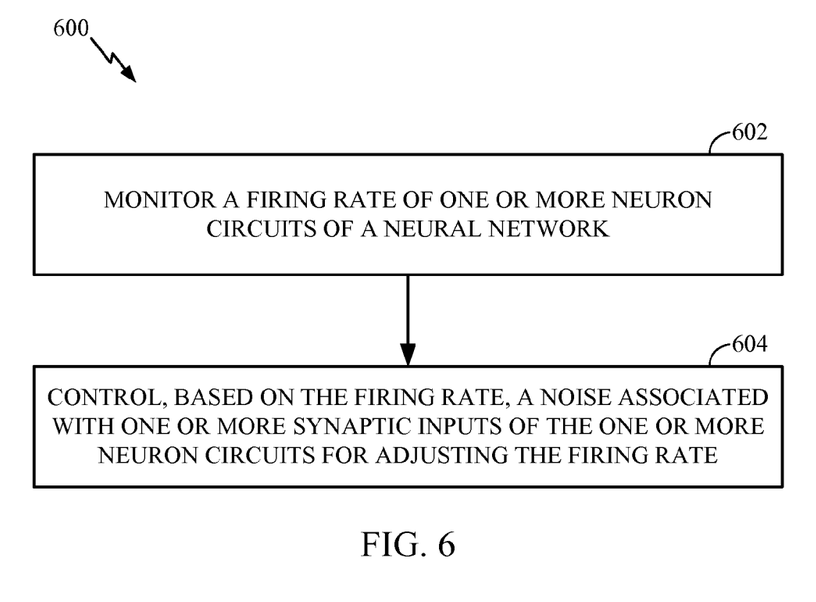
FIG. 6 illustrates example operations that may be performed at a network of neuron circuits in accordance with certain aspects of the present disclosure.

FIG. 6 illustrates example operations 600 that may be performed at a neural network (e.g., at the neural network 504 from FIG. 5) in accordance with certain aspects of the present disclosure. At 602, a firing rate of one or more neuron circuits of the neural network may be monitored. At 604, a noise associated with one or more synaptic inputs of the one or more neuron circuits may be controlled for adjusting the firing rate.

In one aspect of the present disclosure, controlling of the noise may comprise injecting the noise into the one or more synaptic inputs, if the firing rate is below a target rate (i.e., below a homeostatic firing rate). A level of the noise being injected may be based on a difference between the target rate and the firing rate. Further, a level of the noise being injected may be controlled by a predefined parameter (i.e., a rate of change in noise level).

In another aspect of the present disclosure, controlling of the noise may comprise removing the noise from the one or more synaptic inputs, if the firing rate is greater than the target rate (i.e., greater than a homeostatic firing rate). A level of the noise being removed may depend on a difference between the firing rate and the target rate. Further, a level of the noise being removed may be controlled by a predefined parameter (i.e., a rate of change in noise level).

Figure 6A:
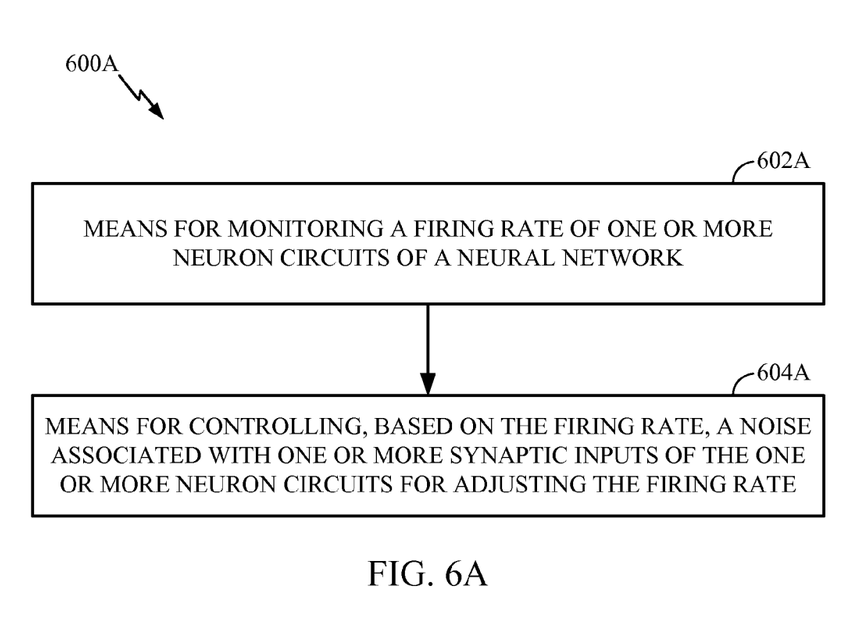
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 600 illustrated in FIG. 6 correspond to components 600A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of a list of" items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An electrical circuit, comprising:
a first circuit configured to monitor a firing rate of one or more neuron circuits of the electrical circuit; and
a second circuit configured to control, based on the firing rate, a noise associated with one or more synaptic inputs of the one or more neuron circuits for adjusting the firing rate.

2. The electrical circuit of claim 1, wherein the second circuit is also configured to:
inject the noise into the one or more synaptic inputs, if the firing rate is below a target rate.

3. The electrical circuit of claim 2, wherein a level of the noise being injected is based on a difference between the target rate and the firing rate.

4. The electrical circuit of claim 2, wherein a level of the noise being injected is controlled by a predefined parameter.

5. The electrical circuit of claim 1, wherein the second circuit is also configured to:
remove the noise from the one or more synaptic inputs, if the firing rate is greater than a target rate.

6. The electrical circuit of claim 5, wherein a level of the noise being removed is based on a difference between the firing rate and the target rate.

7. The electrical circuit of claim 5, wherein a level of the noise being removed is controlled by a predefined parameter.

8. The electrical circuit of claim 1, wherein the first circuit is also configured to monitor the firing rate via a direct measurement.

9. The electrical circuit of claim 1, wherein the first circuit is also configured to:
monitor the firing rate via an indirect measurement of resource consumption associated with the electrical circuit.

10. The electrical circuit of claim 1, further comprising:
a third circuit configured to generate a predefined level of background noise into a network of the one or more neuron circuits.

11. A method for implementing a neural network, comprising:
monitoring a firing rate of one or more neuron circuits of the neural network; and
controlling, based on the firing rate, a noise associated with one or more synaptic inputs of the one or more neuron circuits for adjusting the firing rate.

12. The method of claim 11, wherein controlling comprises:
injecting the noise into the one or more synaptic inputs, if the firing rate is below a target rate.

13. The method of claim 12, wherein a level of the noise being injected is based on a difference between the target rate and the firing rate.

14. The method of claim 12, wherein a level of the noise being injected is controlled by a predefined parameter.

15. The method of claim 11, wherein controlling comprises:
removing the noise from the one or more synaptic inputs, if the firing rate is greater than a target rate.

16. The method of claim 15, wherein a level of the noise being removed is based on a difference between the firing rate and the target rate.

17. The method of claim 15, wherein a level of the noise being removed is controlled by a predefined parameter.

18. The method of claim 11, wherein the firing rate is monitored via a direct measurement.

19. The method of claim 11, wherein the firing rate is monitored via an indirect measurement of resource consumption associated with the neural network.

20. The method of claim 11, further comprising:
generating a predefined level of background noise into the neural network.

21. An apparatus, comprising:
means for monitoring a firing rate of one or more neuron circuits of the apparatus; and
means for controlling, based on the firing rate, a noise associated with one or more synaptic inputs of the one or more neuron circuits for adjusting the firing rate.

22. The apparatus of claim 21, wherein the means for controlling comprises:
means for injecting the noise into the one or more synaptic inputs, if the firing rate is below a target rate.

23. The apparatus of claim 22, wherein a level of the noise being injected is based on a difference between the target rate and the firing rate.

24. The apparatus of claim 22, wherein a level of the noise being injected is controlled by a predefined parameter.

25. The apparatus of claim 21, wherein the means for controlling comprises:
means for removing the noise from the one or more synaptic inputs, if the firing rate is greater than a target rate.

26. The apparatus of claim 25, wherein a level of the noise being removed is based on a difference between the firing rate and the target rate.

27. The apparatus of claim 25, wherein a level of the noise being removed is controlled by a predefined parameter.

28. The apparatus of claim 21, wherein the firing rate is monitored via a direct measurement.

29. The apparatus of claim 21, wherein the firing rate is monitored via an indirect measurement of resource consumption associated with the apparatus.

30. The apparatus of claim 21, further comprising:
means for generating a predefined level of background noise into the apparatus.

* * * * *